(12) United States Patent
Fukumura et al.

(10) Patent No.: US 9,304,918 B2
(45) Date of Patent: Apr. 5, 2016

(54) COMPUTER SYSTEM AND CACHE CONTROL METHOD

(71) Applicant: HITACHI, LTD., Tokyo (JP)

(72) Inventors: Yuusuke Fukumura, Tokyo (JP); Ken Sugimoto, Tokyo (JP); Nobukazu Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 128 days.

(21) Appl. No.: 14/287,206

(22) Filed: May 27, 2014

(65) Prior Publication Data

US 2014/0359227 A1    Dec. 4, 2014

(30) Foreign Application Priority Data

May 28, 2013    (JP) ................................. 2013-111690

(51) Int. Cl.
*G06F 12/00*    (2006.01)
*G06F 12/08*    (2006.01)
*H04L 29/08*    (2006.01)
*G06F 3/06*    (2006.01)
*G06F 12/12*    (2006.01)

(52) U.S. Cl.
CPC .......... *G06F 12/0808* (2013.01); *G06F 3/0683* (2013.01); *G06F 12/08* (2013.01); *G06F 12/0802* (2013.01); *G06F 12/0866* (2013.01); *G06F 12/0868* (2013.01); *G06F 12/0871* (2013.01); *G06F 12/12* (2013.01); *H04L 67/2852* (2013.01); *G06F 2212/1016* (2013.01); *G06F 2212/311* (2013.01)

(58) Field of Classification Search
CPC . G06F 12/08; G06F 12/0802; G06F 12/0866; G06F 12/0868; G06F 3/0683
See application file for complete search history.

(56) References Cited

U.S. PATENT DOCUMENTS

2010/0250857 A1    9/2010    Matsui
2011/0087833 A1    4/2011    Jones

*Primary Examiner* — Shawn X Gu
(74) *Attorney, Agent, or Firm* — Mattingly & Malur, P.C.

(57) ABSTRACT

A computer system, comprising: a server; and a storage system, the server including an operating system, the storage system including a storage control part, wherein the operating system is configured to: transmit a read request for first data to the storage system in a case of receiving the read request for the first data not stored in a server cache from an application; store the first data received from the storage system into the server cache, and wherein the storage control part is configured to: read the first data from the storage cache, transmit the read first data to the server, and invalidate the first data stored in the storage cache.

12 Claims, 14 Drawing Sheets

POLICY INFORMATION

| LUN | ACCESS SIZE THRESHOLD |
|---|---|
| 1 | XX (MB) |
| 2 | YY (MB) |
| ⋮ | ⋮ |

COMPUTER SYSTEM AND CACHE CONTROL METHOD

CLAIM OF PRIORITY

The present application claims priority from Japanese patent application JP 2013-111690 filed on May 28, 2013, the content of which is hereby incorporated by reference into this application.

BACKGROUND OF THE INVENTION

This invention relates to a system and method for achieving cache control that improves the efficiency of using a cache.

In recent years, nonvolatile memories (NVM) such as a flash memory are used in various electronic devices. Unlike a hard disk drive (HDD), the nonvolatile memory does not involve a mechanical operation, and permits faster access than the HDD.

Nonvolatile memories are also used in enterprise applications such as a server and a storage system that need fast data access. Particularly, nonvolatile memories mountable in servers become inexpensive, and are thus becoming popular.

Various computer systems have been proposed that use a nonvolatile memory to achieve fast data access (see, for example, the description of US 2011/0087833 A1). US 2011/0087833 A1 describes a system, in which data to be stored in a storage system, is temporarily stored in a cache device provided in a server. This architecture eliminates the need to access to the storage system, thus increasing access speed to data.

SUMMARY OF THE INVENTION

A storage system that constructs a computer system includes a cache using a DRAM or the like in addition to a server. According to the related-art control method, when a server stores data obtained from a storage system into a cache, the same data is stored in the cache of the storage system. This caching is performed because when reading data from a storage medium such as an HDD, a storage system temporarily stores the read data into its cache.

Accordingly, the same data is stored in the cache of the server and the cache of the storage system. Because data stored in the cache of the storage system is hardly used, however, the cache area cannot be used efficiently.

This invention has been made in view of the above-mentioned problem. Accordingly, it is an object of this invention to provide a system and method for achieving cache control that improves the efficiency of using caches of a server and a storage system.

The present invention can be appreciated by the description which follows in conjunction with the following figures, wherein: a computer system, comprising: a server, on which a application runs; and a storage system for storing data to be used by the application. The server includes a first processor, a first memory, a cache device, in which a server cache for temporarily storing data is set up, and a first interface for coupling to another apparatus. The storage system includes a controller and a plurality of storage devices. The controller includes a second processor, a second memory, and a second interface for coupling to another device. The server includes an operating system for controlling the server. The storage system includes a storage cache for temporarily storing data and a storage control part for controlling the storage system. The operating system includes a cache driver for controlling the server cache. The operating system is configured to: transmit a read request for first data not stored in the server cache to the storage system in a case of receiving the read request for the first data from the application; transmit the first data received from the storage system to the application; and store the first data received from the storage system into the server cache. The storage control part is configured to: determine whether the first data is stored in the storage cache in a case of receiving the read request for the first data from the server; read the first data from the storage cache in a case where it is determined that the first data is stored in the storage cache, transmit the read first data to the server, and invalidate the first data stored in the storage cache; and read the first data from the plurality of storage devices in a case where it is determined that the first data is not stored in the storage cache, and transmit the read first data to the server.

According to one embodiment of this invention, data read from the storage system is stored in the server cache alone, thereby improving the overall cache using efficiency of the computer system.

BRIEF DESCRIPTION OF THE DRAWINGS

The present invention can be appreciated by the description which follows in conjunction with the following figures, wherein:

FIG. 5 is an explanatory diagram illustrating an example of policy information in the second embodiment of this invention;

DETAILED DESCRIPTION OF THE PREFERRED EMBODIMENTS

Figure 1:
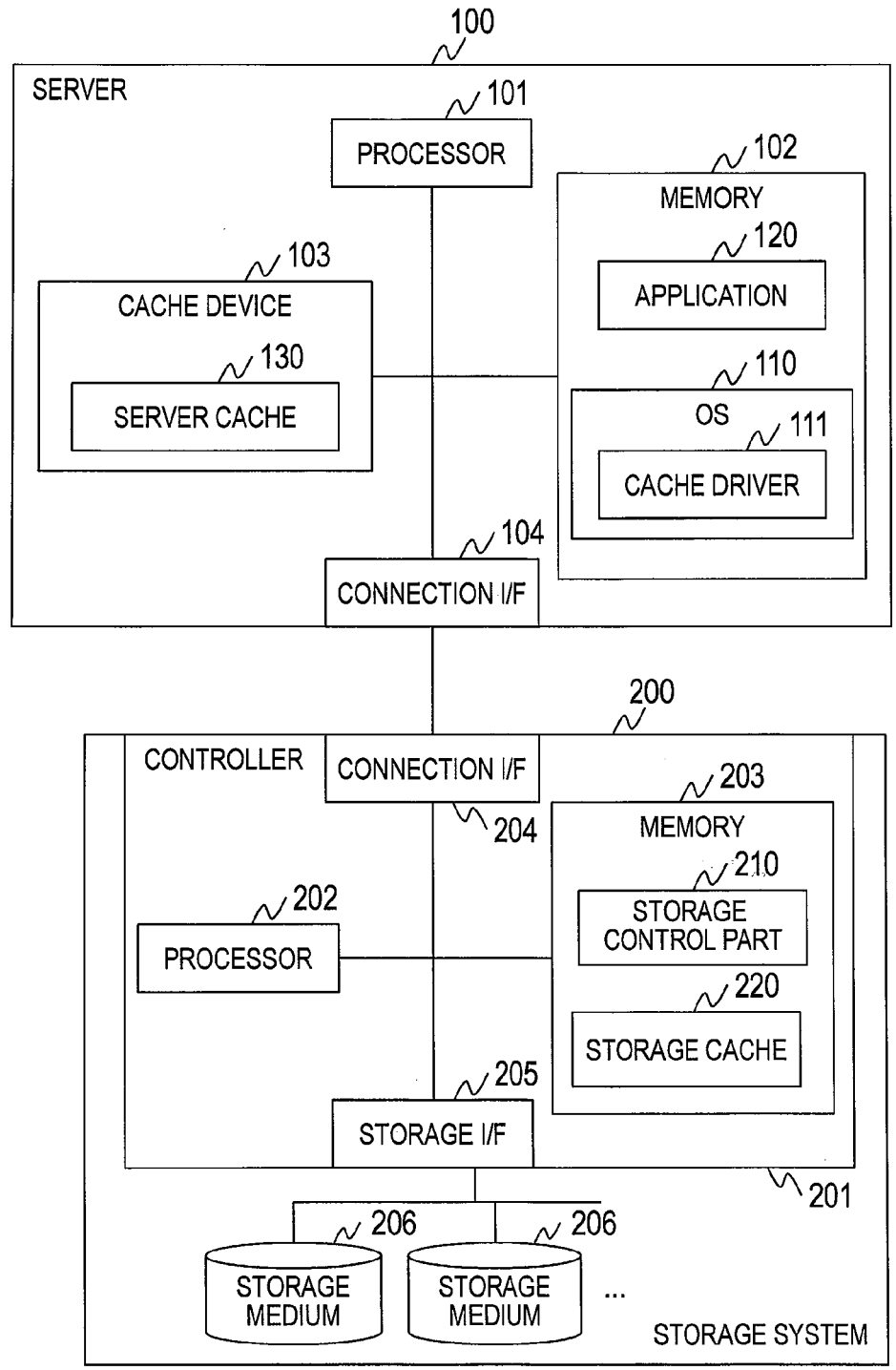
FIG. 1 is a block diagram illustrating an example of the configuration of a computer system according to a first embodiment of this invention.

Embodiments of this invention are described hereinunder referring to the drawings.

First Embodiment

FIG. 1 is a block diagram illustrating an example of the configuration of a computer system according to a first embodiment of this invention.

The computer system of the first embodiment includes a server 100 and a storage system 200.

The server 100 and the storage system 200 are coupled to each other over a local area network (LAN) or a storage area network (SAN). It should be noted that the computer system may include the server 100 and the storage system 200 within the same chassis. In this case, the server 100 and the storage system 200 are connected to each other via a backplane.

According to the first embodiment, it is assumed that a single server 100 is coupled to a single storage system 200. A computer system that includes a plurality of servers 100 coupled to the same storage system 200 is described in a third embodiment of this invention.

The server 100 is a computer that performs predetermined tasks. The server 100 includes a processor 101, a memory 102, a cache device 103, and a connection interface 104, which are interconnected by internal buses. The server 100 may include a storage device and an input/output device. The storage device may be, for example, a hard disk drive (HDD). The input/output device includes a keyboard, a mouse, a touch panel, and a display.

The processor 101 runs a program stored in the memory 102. The execution of the program by the processor 101 achieves the functions of the server 100. In the following description, processes, which are described to be carried out mainly by the program, imply that the program is run by the processor 101.

The memory 102 stores a program to be run by the processor 101 and information needed to run the program. The program and information, which are to be stored in the memory 102, are described later.

The cache device 103 achieves a server cache 130 that temporarily stores data. The entire storage area of the cache device 103 is used as the server cache 130.

According to this embodiment, it is assumed that a solid state drive (SSD) having a flash memory is used as the cache device 103. It should be noted that the cache device 103 is not limited to a nonvolatile memory such as a flash memory. For example, a volatile memory such as a DRAM may be used.

Logical unit (LU) data is stored in the server cache 130 according to this embodiment in logical blocks. In this case, logical blocks of data may be stored using a buffer cache. The buffer cache includes a buffer head for specifying a storage location for each logical block.

For example, a cache driver 111 allocates a buffer page to the server cache 130, and divides the buffer page into block buffers of a predetermined block size to generate a buffer cache. It should be noted that an LU is provided by the storage system 200 as described later.

In the following description, logical blocks of data are also described as block data.

The connection interface 104 is a device for connection to an external apparatus such as the storage system 200. In a case where the server 100 is coupled to the storage system 200 over a SAN, for example, a fiber channel (FC) adapter card is used as the connection interface 104. In a case where the server 100 is coupled to the storage system 200 over a LAN, a network interface card (NIC) is used as the connection interface 104.

Next, the program and information to be stored in the memory 102 are described. The memory 102 according to this embodiment stores an operating system (OS) 110 and a program that achieves an application 120. The memory 102 may store another program and information.

The OS 110 provides a function to control the server 100, and controls data transfer between the server 100 and the storage system 200. The OS 110 includes the cache driver 111 that manages the server cache 130. It should be noted that the OS 110 includes a file system, a device driver, and the like (not shown), which are known and are not therefore described.

The application 120 performs a predetermined task. This invention is not limited to the type and the contents of the task of the application 120 that runs on the server 100.

The program and information to be stored in the memory 102 may be stored in the storage system 200 or a storage apparatus provided in the server. In this case, the processor 101 reads the program and information from the storage system 200 or the storage apparatus, and loads the read program and information into the memory 102.

The storage system 200 stores information necessary for a task that is performed by the server 100. The storage system 200 includes a controller 201 and a plurality of storage media 206, which are interconnected by internal buses.

The controller 201 controls the storage system 200, and controls data transfer between the server 100 and the storage system 200. The controller 201 includes a processor 202, a memory 203, a connection interface 204, and a storage interface 205, which are interconnected by internal buses.

The processor 202 runs a program stored in the memory 203. The execution of the program by the processor 202 achieves the functions of the storage system 200. In the following description, processes that are described to be carried out mainly by the program imply that the program is run by the processor 202.

The memory 203 stores a program to be run by the processor 202 and information needed to run the program. The program and information that are to be stored in the memory 203 are described later. The memory 203 includes a storage cache 220 that is a storage area for temporarily storing data.

The connection interface 204 is a device for connection to an external apparatus such as the server 100. In a case where the server 100 is coupled to the storage system 200 over a SAN, for example, a channel adapter (CA) is used as the connection interface 204. In a case where the server 100 is coupled to the storage system 200 over a LAN, a NIC is used as the connection interface 204.

The storage interface 205 is a device for connection to the storage media 206. The storage medium 206 is a device for storing data. For example, the storage medium 206 may be an HDD or SSD. It should, be noted that the storage medium 206 may be any device that can store data.

Next, the program and information to be stored in the memory 203 are described. The memory 203 according to this embodiment stores a program that achieves a storage control part 210. The memory 203 may store another program and information. For example, the memory 203 may store information for managing data to be stored in the storage medium 206.

The storage control part 210 controls the storage system 200. According to this embodiment, a plurality of storage media 206 are used to configure a RAID. The storage control part 210 logically divides the RAID volume to generate a plurality of LUs. The storage control part 210 also provides the server 100 with the generated LUs.

The storage control part 210 holds management information indicating the correlation between the LUs and the storage media 206. In a case of receiving an I/O request for an LU from the server 100, the storage control part 210 accesses the storage medium 206 that provides a storage area (logical block) forming the LU based on the management information. The storage control part 210 also has various functions including an LU managing function, a data transfer function, and a cache control function.

The program and information to be stored in the memory 203 may be stored in the storage medium 206. In this case, the processor 202 reads the program and information from the storage medium 206, and loads the read program and information into the memory 203.

Although the storage cache 220 is set on the memory 203 of the storage system 200, this invention is not limited to this architecture. The controller 201 may include a caching memory. The caching memory may be any one of a nonvolatile memory and a volatile memory.

Figure 2A:
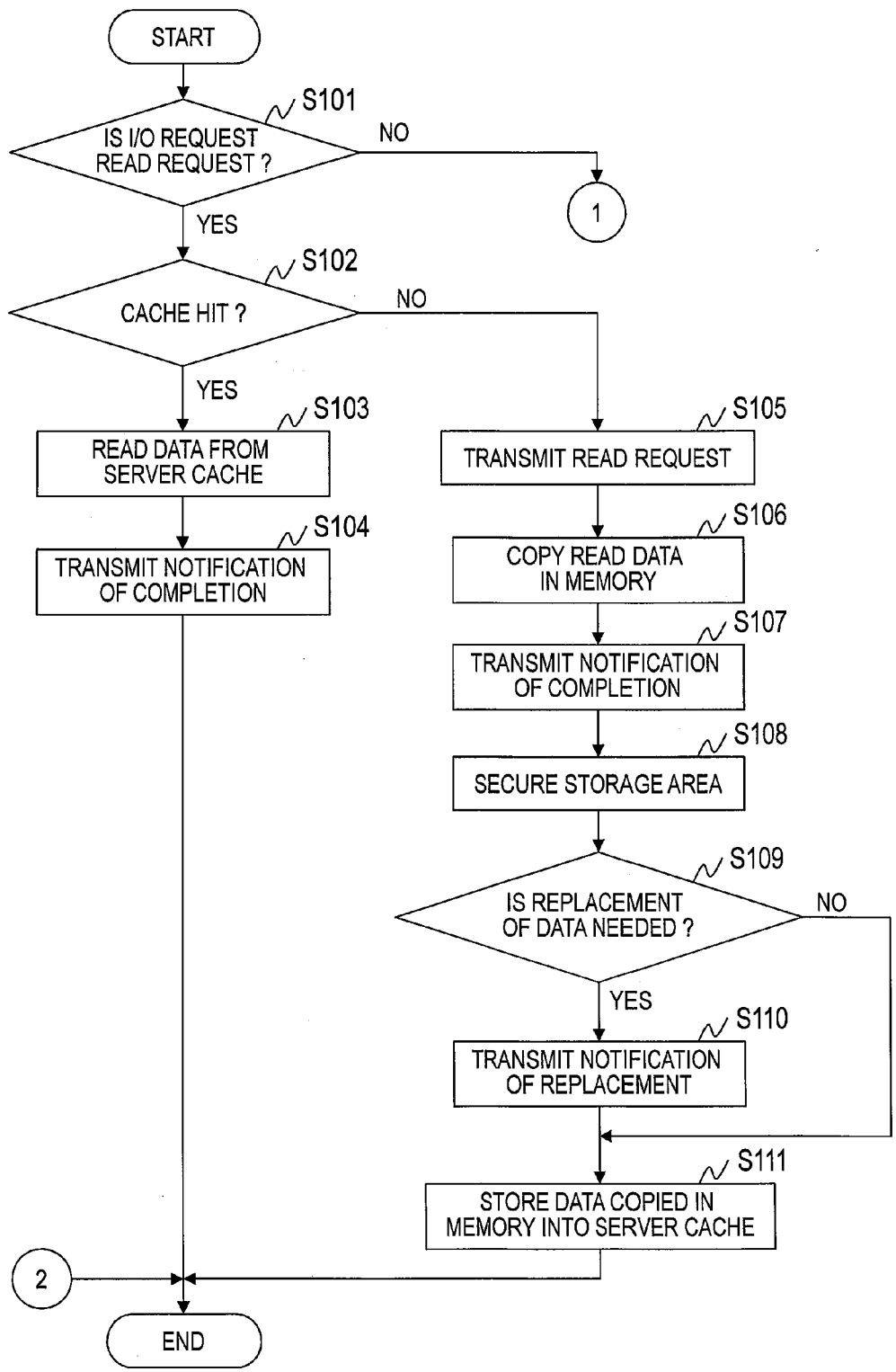
FIGS. 2A and 2B are flowcharts illustrating an example of I/O processing that is performed by a server according to the first embodiment of this invention.
Figure 2B:
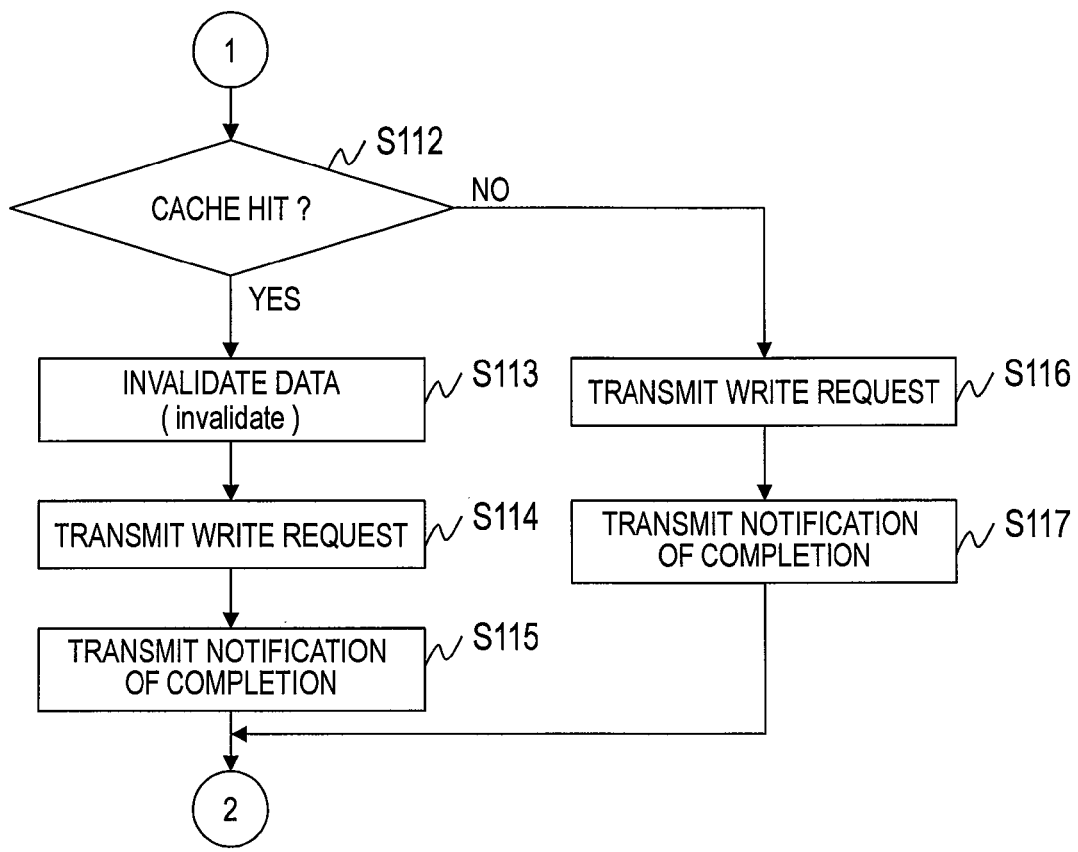

FIGS. 2A and 2B are flowcharts illustrating an example of I/O processing that is performed by the server 100 according to the first embodiment of this invention.

In a case of receiving an I/O request from the application 120, the OS 110 starts I/O processing to be described below. The I/O request includes information identifying a file to be accessed or information identifying block data to be accessed. For example, the I/O request includes a file name or the like when a file is to be accessed, or includes a block number or the like when block data is to be accessed. According to this embodiment, it is assumed that the I/O request includes a file name.

The OS 110 determines whether or not the I/O request is a read request (Step S101).

In a case where it is determined that the I/O request is a read request, the OS 110 determines whether or not data to be read is present in the server cache 130 (Step S102). Specifically, the following process is performed.

The OS 110 requests a file system that manages data (file) to be read to read the data (file). The file system calls the cache driver 111, and instructs the cache driver 111 to retrieve the data (file) to be read. This instruction includes information specifying data to be read, namely, information specifying the block number of block data in a file. In the following description, information specifying the block number of block data in a file is also described as block obtaining information.

The called cache driver 111 specifies the block number of block data in a file based on the block obtaining information. In a case where the file includes a plurality of pieces of block data, the cache driver 111 specifies the block number of every block data included in the file.

The cache driver 111 retrieves block data of the data (file) to be read from among data stored in the server cache 130. Because the method of retrieving block data stored in a cache is a known technology, its detailed description is omitted.

In a case where the data (file) to be read is present, the cache driver 111 outputs the retrieved data (file) to the OS 110. In a case where the data (file) to be read is not present, the cache driver 111 notifies the OS 110 that the data (file) is not present.

The above is the description of the process of Step S102.

In a case where it is determined that the data (file) to be read is present in the server cache 130, in other words, in a case where a cache hit occurs, the OS 110 reads data from the server cache 130 (Step S103), transmits a notification of completion of the reading process to the application 120 (Step S104), and terminates the processing.

Specifically, the cache driver 111 outputs the retrieved data (file) to the OS 110. The OS 110 outputs the data (file) read from the cache driver 111 along with the notification of completion to the application 120.

In a case where it is determined that the data to be read is not present in the server cache 130, in other words, in a case where a cache mishit occurs, the OS 110 transmits a read request to the storage system 200 (Step S105). Specifically, the following process is performed.

The cache driver 111 registers the read request for block data in a file, and calls a device driver. It should be noted that the processing of the application 120 stands by until the application 120 receives the notification of completion of the registered read request from the device driver.

The device driver transmits the read request to the storage system 200 based on the registered read request. The read request to be transmitted by the device driver includes information identifying the LU of the destination, from which data is to be read, and identification information for specifying block data. For example, the read request includes the block number or the like of the logical block in the LU.

As described above, the server 100 transmits an I/O request for each block to the storage system 200.

The above is the description of the process of Step S105.

The OS 110 copies the data read from the storage system 200 into the memory 102 (Step S106).

Specifically, the OS 110 copies the data (file) output from the device driver into the memory 102. This is to temporarily hold the data (file) to be stored in the server cache. Because data is read from the storage system 200 for each block, the OS 110 copies every block data in a file into the memory 102 after every block data in the file is read.

The OS 110 transmits a notification of completion to the application 120 (Step S107). At this time, the OS 110 transmits the read data along with the notification of completion to the application 120.

The OS 110 secures a storage area on the server cache 130 (Step S108).

Specifically, the cache driver 111 secures the storage area on the server cache 130. This is a process for securing a storage area for storing the data copied in the memory 102 into the server cache 130.

The OS 110 determines whether or not data in the server cache 130 need be replaced based on the result of the above-mentioned process (Step S109). In other words, the OS 110 determines whether or not a storage area for storing data copied in the memory 102 is insufficient.

In a case where it is determined that data in the server cache 130 need not be replaced, the OS 110 proceeds to Step S111.

In a case where it is determined that data in the server cache 130 need be replaced, the OS 110 transmits a notification of replacement to the storage system 200 (Step S110). Specifically, the following process is performed.

The cache driver 111 selects data to be replaced from among data stored in the server cache 130, and calls a device driver. It is assumed here that at least one block data is selected. Further, information identifying the selected block data is input to the device driver. The block data identifying information may be the block number of block data, for example.

The device driver transmits a notification of replacement including the information identifying the selected block data to the storage system 200.

The data selection scheme used is a least recently used (LRU) approach. According to the LRU approach, least recently used data is selected. Because the LRU-based cache control method is a known technology, its detailed description is omitted. The data selection scheme is not limited to the LRU approach. For example, another approach is such that priority is given to data in advance, and data with low priority is selected. In addition, the administrator or user or the like of the computer system may specify data to be pushed out.

Information such as the data access date and hour and an access frequency may be obtained from data management information or the like held in the file system or the storage system 200.

Although the notification of replacement includes information identifying data to be replaced, the notification of replacement may include this data itself.

The above is the description of the process of Step S110.

The OS 110 stores data copied in the memory 102 into the server cache 130 (Step S111), and terminates the processing. Specifically, the following process is performed.

The cache driver 111 outputs a data obtaining request to the OS 110. The OS 110 outputs data copied in the memory 102 to the cache driver 111. The cache driver 111 stores the output data into the server cache 130.

In the processing following Step S110, the cache driver 111 stores the data copied in the memory 102 into a storage area where the selected data is stored.

The above is the description of the process of Step S111.

In a case where it is determined in Step S101 that the I/O request is not a read request, in other words, the I/O request is a write request, the OS 110 determines whether or not data to be written is present in the server cache 130 (Step S112). The process of Step S112 is the same as the process of Step S102.

In a case where it is determined that data to be written is present in the server cache 130, in other words, in a case where a cache hit occurs, the OS 110 invalidates data stored in the server cache 130 (Step S113).

Specifically, the cache driver 111 invalidates data in the server cache 130. In a case where access is to be carried out file by file, the cache driver 111 invalidates every block data in a file.

The OS 110 transmits the write request to the storage system 200 (Step S114), transmits a notification of completion to the application 120 (Step S115), and then terminates the processing. Specifically, the following process is performed.

The cache driver 111 registers the write request for block data in a file, and calls a device driver. The device driver transmits a write request to the storage system 200 based on the registered write request. In addition, the OS 110 transmits the notification of completion to the application 120.

The write request to be transmitted by the device driver includes information identifying the LU of the destination where data is to be written, and identification information for specifying the data. For example, the write request includes the block number or the like of the logical block in the LU.

The above is the description of the processes of Steps S114 and S115.

In a case where it is determined in Step S112 that the data to be written is not present in the server cache 130, in other words, in a case where a cache mishit occurs, the OS 110 transmits the write request to the storage system 200 (Step S116), transmits the notification of completion to the application 120 (Step S117), and then terminates the processing. The processes of Steps S116 and S117 are identical to the processes of Steps S114 and S115. In Step S116, the cache driver 111 executes control so that the data to be written may not be stored in the server cache 130.

Figure 3A:
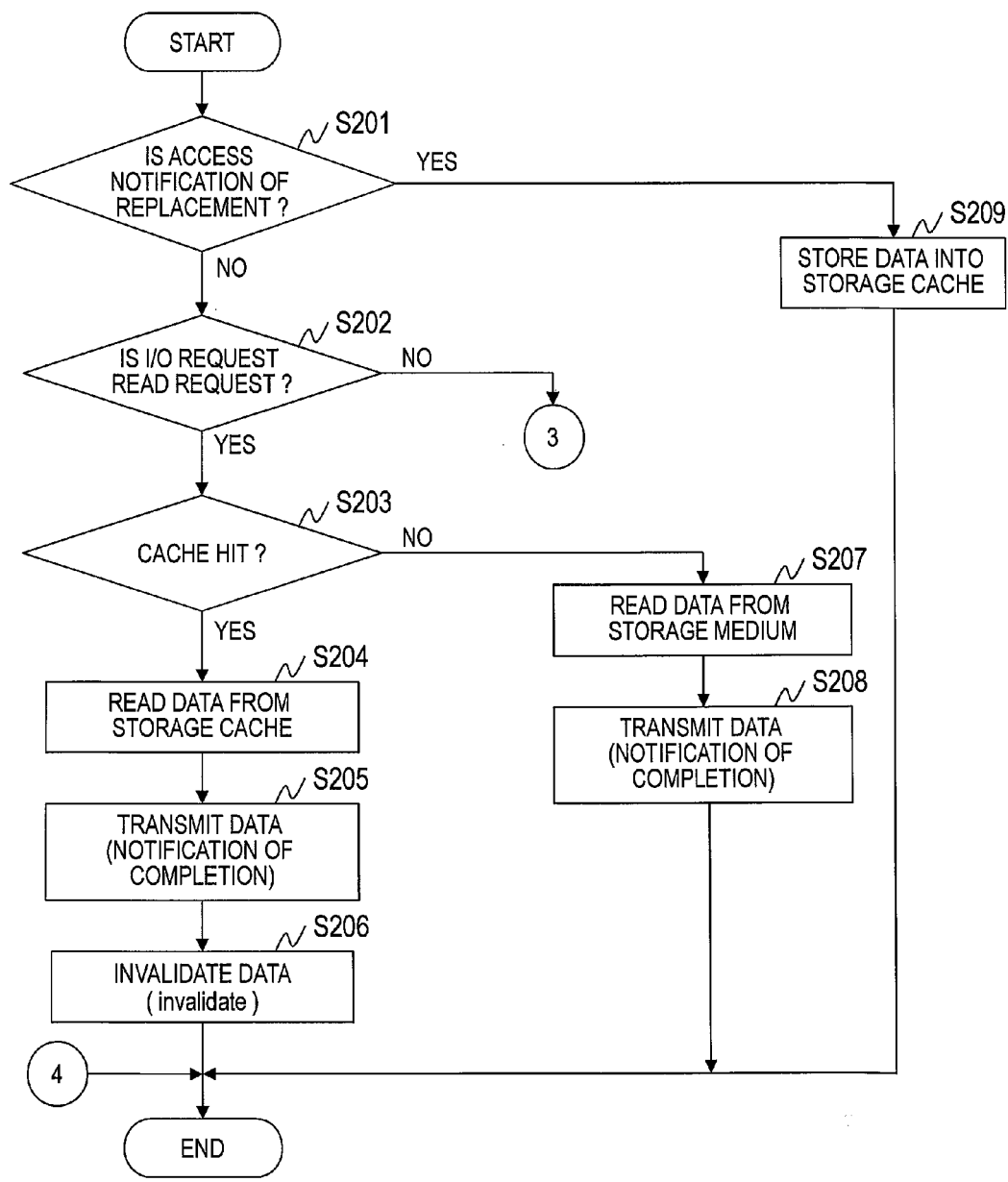
FIGS. 3A and 3B are flowcharts illustrating an example of I/O processing that is performed by a storage system according to the first embodiment of this invention.
Figure 3B:
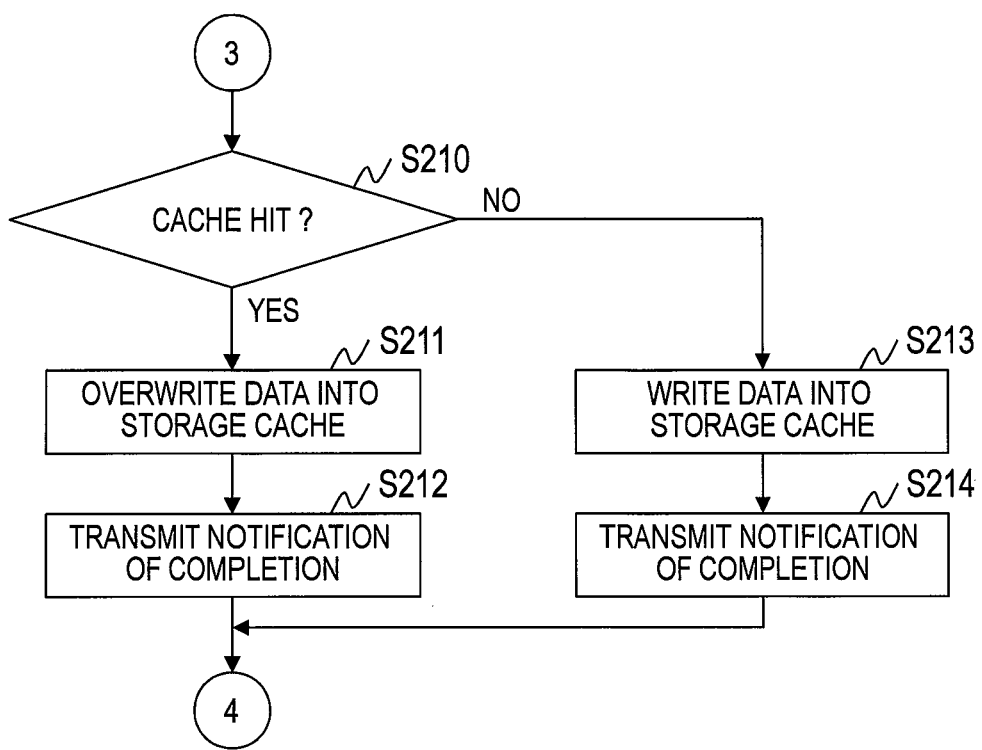

FIGS. 3A and 3B are flowcharts illustrating an example of I/O processing that is performed by the storage system 200 according to the first embodiment of this invention.

The storage control part 210 starts the I/O processing described below, in a case of receiving access from the server 100.

The storage control part 210 determines whether or not the access received from the server 100 is a notification of replacement (Step S201).

In a case where it is determined that the access received from the server 100 is a notification of replacement, the storage control part 210 stores data push out from the server cache 130 into the storage cache 220 (Step S209), and terminates the processing.

Specifically, the storage control part 210 reads data from the storage medium 206 based on information identifying data to be replaced, which is included in the notification of replacement, and stores the read data in the storage cache 220.

In a case where data to be written is included in the notification of replacement, the storage control part 210 stores the data in the storage cache 220.

In a case where it is determined that the access received from the server 100 is not a notification of replacement, in other words, the access is an I/O request, the storage control part 210 determines whether or not the I/O request is a read request (Step S202).

In a case where it is determined that the I/O request is a read request, the storage control part 210 determines whether or not data to be read is present in the storage cache 220 (Step S203).

Specifically, the storage control part 210 retrieves block data to be read from among data stored in the storage cache 220. It should be noted that the read request includes information identifying the LU of the destination, from which block data to be read is read, and identification information for specifying block data. The storage control part 210 can retrieve block data to be read based on information included in the read request and management information indicating the correlation between the LUs and the storage media 206.

In a case where it is determined that data to be read is present in the storage cache 220, in other words, in a case where a cache hit occurs, the storage control part 210 reads data from the storage cache 220 (Step S204).

The storage control part 210 transmits the read data to the server 100 (Step S205). Transmission of the read data corresponds to transmission of the notification of completion.

The storage control part 210 invalidates the data read from the storage cache 220 (Step S206), and terminates the processing.

Accordingly, data to be read is stored in the server cache 130 alone. Because data stored in the storage cache 220 is invalidated, it is possible to secure the storage area available to the storage cache 220.

In a case where it is determined in Step S203 that data to be read is not present in the storage cache 220, in other words, in a case where a cache mishit occurs, the storage control part 210 reads data from the storage medium 206 (Step S207), transmits the read data to the server 100 (Step S208), and then terminates the processing. Transmission of the read data corresponds to transmission of the notification of completion. At this time, the storage control part 210 executes control so that the block data to be read may not be stored in the storage cache 220.

The storage system 200 repeatedly executes similar processing on every block data in the file. In a case where a read request is received, the storage system 200 therefore executes control so that none of the block data in the file may be stored in the storage cache 220. In a case where a write request is received, every block data in the file is stored in the storage cache 220.

The effects of this invention are described now.

According to this invention, the cache driver 111 and the storage control part 210 execute control so that the same data is not stored in the server cache 130 and the storage cache 220. Specifically, the following process is performed.

Cache Control in Reading Process

In a case where a read request for data that is not stored in the server cache 130 is received from the application 120, the following cache control is carried out.

The cache driver 111 stores data to be read into the server cache 130 (Step S111). At this time, in order to store data to be read into the server cache 130, the cache driver 111 replaces predetermined data in the server cache 130 with the data to be read, and transmits a notification of replacement to the storage system 200 (Step S110).

Meanwhile, the storage control part 210 executes control so that the data to be read is not stored in the storage cache 220. In other words, in a case where the data to be read is stored in the storage cache 220, the storage control part 210 invalidates this data (Step S206), whereas in a case where the data to be read is not stored in the storage cache 220, the storage control part 210 executes control so that the data to be read is not stored in the storage cache 220 (Step S207, Step S208).

Further, the storage control part 210 stores the data replaced in the server cache 130 into the storage cache 220 based on the notification of replacement (Step S209).

Through the above-mentioned processing, data read by the application 120 is stored in the server cache 130 alone. Therefore, it is possible to avoid duplication of data in the server cache 130 and the storage cache 220. Moreover, it is possible to secure a storage area available to the server cache 130 and the storage cache 220. In addition, fast data reading can be achieved by storing data pushed out from the server cache 130 into the storage cache 220.

In general, data stored in the server cache 130 is data read by the application 120, and hence the data is likely to be read again by the application 120. In a case where a notification of replacement is not transmitted, the replaced data is stored in neither the server cache 130 nor the storage cache 220. Therefore, the data needs to be read again from the storage medium 206, causing an overhead in the reading process of the application 120.

In this respect, according to this invention, data replaced in the server cache 130 is stored in the storage cache 220 to minimize the overhead of the reading process of the application 120.

Cache Control in Writing Process

In a case where a write request for data is received from the application 120, the following cache control is carried out.

The cache driver 111 executes control so that the data to be written is not stored in the server cache 130. In other words, in a case where the data to be written is stored in the server cache 130, the cache driver 111 invalidates this data (Step S113), whereas in a case where the data to be written is not stored in the server cache 130, the cache driver 111 executes control so that the data to be written is not stored in the server cache 130 (Step S116, Step S117).

Meanwhile, the storage control part 210 stores the data to be written into the storage cache 220 (Step S211, Step S213).

Through the above-mentioned processing, data written by the application 120 is stored in the storage cache 220 alone. Therefore, it is possible to avoid duplication of data in the server cache 130 and the storage cache 220. Moreover, it is possible to secure a storage area available to the server cache 130 and the storage cache 220.

The differences from the related art are described below.

Figure 9A:
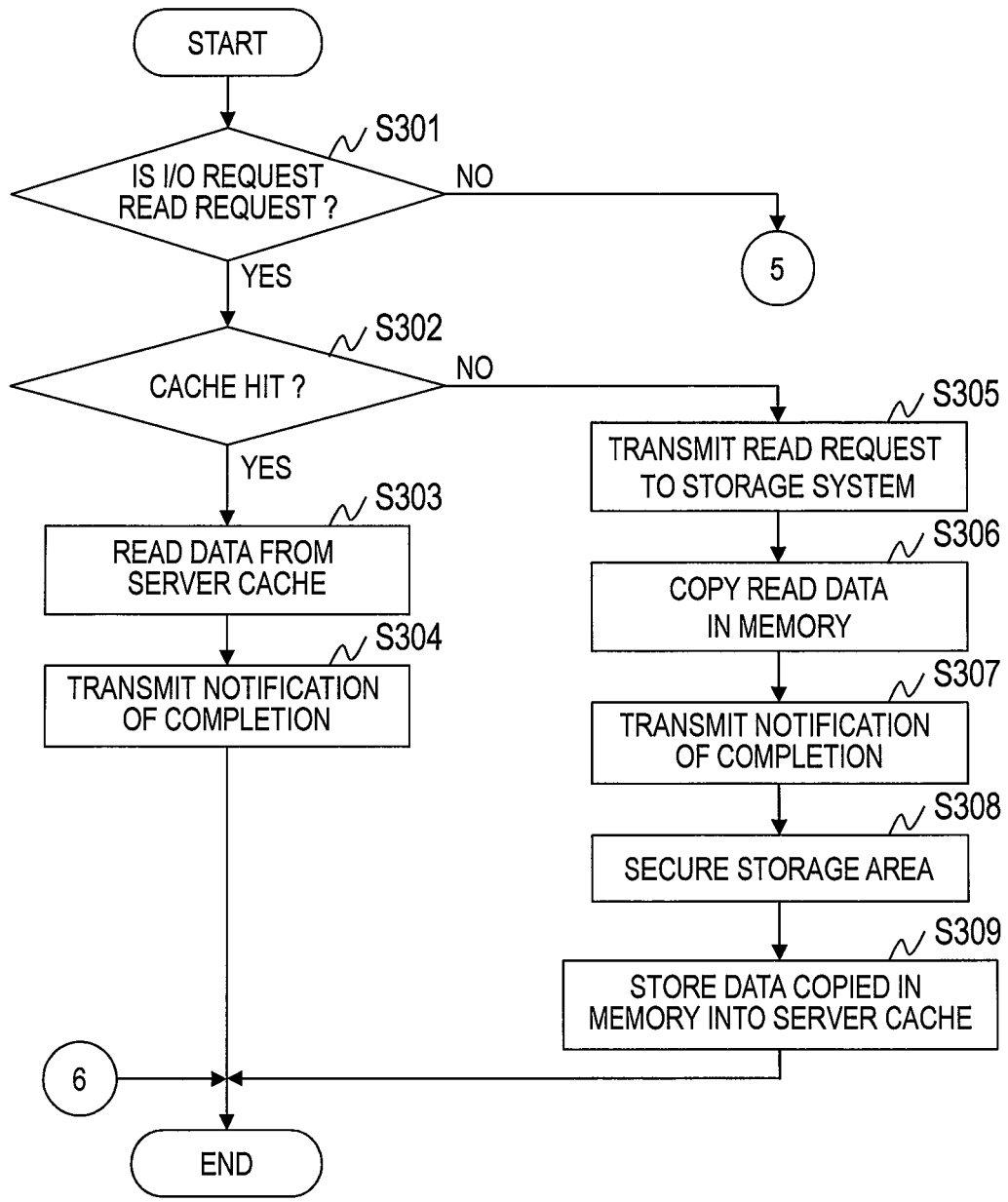
FIGS. 9A and 9B are flowcharts illustrating I/O processing that is performed by a related-art server.
Figure 9B:
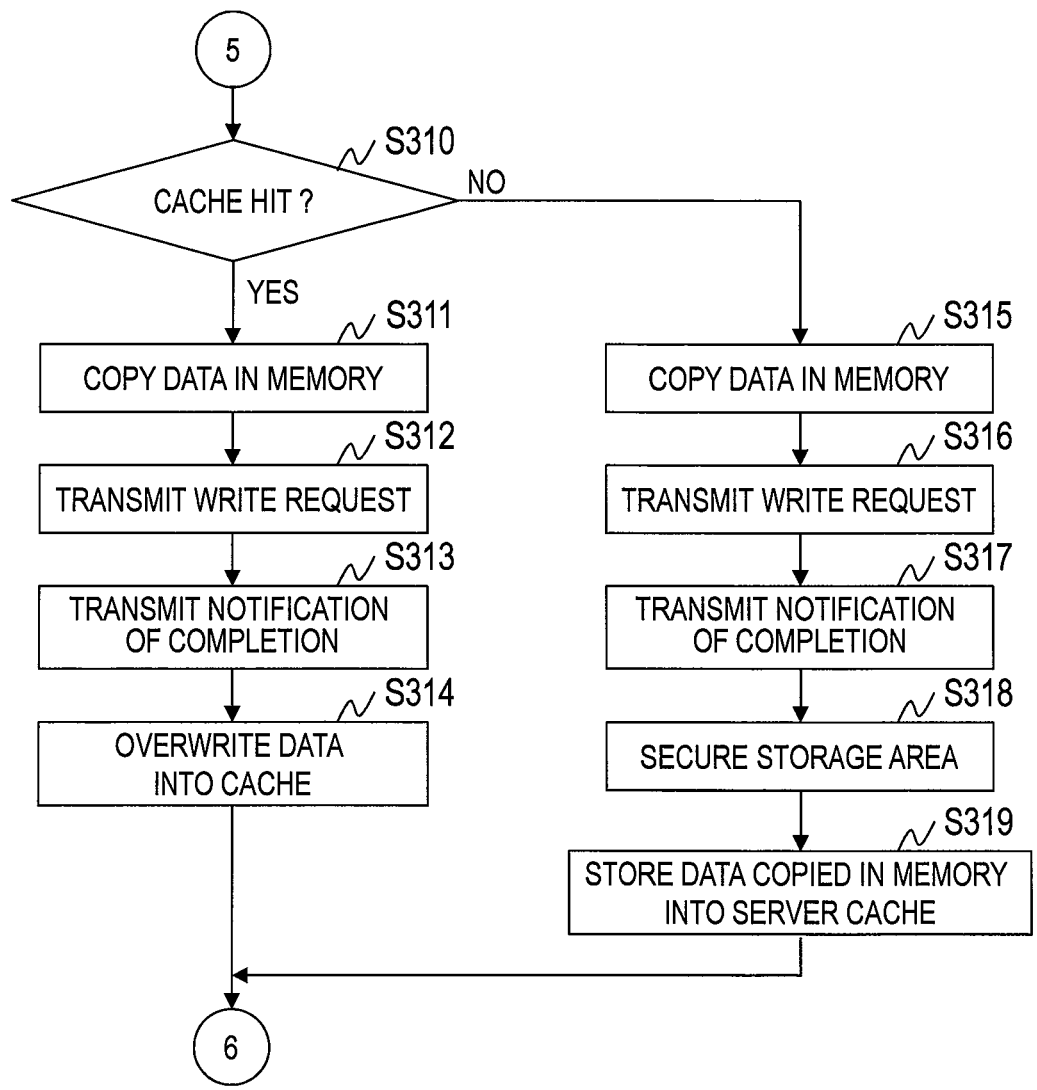

FIGS. 9A and 9B are flowcharts illustrating I/O processing that is performed by a related-art server.

Because the configuration of the computer is the same as that of this embodiment, its description is omitted.

In a case of receiving an I/O request from an application, the OS determines whether or not the I/O request is a read request (Step S301).

In a case where it is determined that the I/O request is a read request, the OS determines whether or not data to be read is present in a server cache (Step S302).

In a case where it is determined that data to be read is present in the server cache, the OS reads data from the server cache (Step S303), transmits a notification of completion of the reading process to the application (Step S304), and then terminates the processing. At this time, the OS transmits the read data along with the notification of completion to the application.

In a case where it is determined that data to be read is not present in the server cache, the OS transmits a read request to the storage system (Step S305).

At this time, the storage system transmits predetermined data to the server in response to the read request. The related-art storage system stores data to be read into the storage cache.

After receiving data from the storage system, the OS copies the data into the memory (Step S306). This is to temporarily hold data to be stored in the server cache.

After receiving a notification of completion of the reading process from the storage system, the OS transmits a notification of completion to the application (Step S307). The OS secures a storage area on the server cache (Step S308), stores the data copied in the memory into the secured storage area (Step S309), and then terminates the processing.

In a case where it is determined in Step S301 that the I/O request is not a read request, in other words, the I/O request is a write request, the OS determines whether or not data to be written is present in the server cache (Step S310).

In a case where it is determined that data to be written is present in the server cache, the OS copies the data to be written into the memory (Step S311). This is to temporarily hold data to be stored in the server cache. Thereafter, the OS transmits a write request to the storage system (Step S312), and transmits a notification of completion to the application (Step S313).

At this time, the storage system stores the data to be written in the storage cache, and then writes the data to be written into the storage medium.

The OS overwrites the data copied in the memory in the storage area in the server cache where the data to be written is stored (Step S314), and then terminates the processing.

The processes of Steps S311 to S314 are the general cache control method using the write through approach.

In a case where it is determined in Step S310 that data to be written is present in the server cache, the OS copies the data to be written into the memory (Step S315). Thereafter, the OS transmits a write request to the storage system (Step S316), and transmits a notification of completion to the application (Step S317).

At this time, the storage system stores the data to be written in the storage cache, and then writes the data to be written into the storage medium.

The OS secures a storage area on the server cache (Step S318), stores the data copied in the memory in the secured storage area (Step S319), and then terminates the processing.

According to the related-art cache control method, the processes of Steps S305 and S309 permit the same data to be stored in the server cache and the storage cache.

According to this invention, by way of contrast, the cache driver 111 and the storage control part 210 cooperate to execute control in such a way that data to be read is stored in the server cache 130 alone.

According to the related-art cache control method, the processes of Steps S311 to S314 and the processes of Step S315 to S319 permit the same data to be stored in the server cache and the storage cache.

According to this invention, by way of contrast, the cache driver 111 and the storage control part 210 cooperate to execute control in such a way that data to be written is stored in the storage cache 220 alone.

According to the first embodiment, as described above, the server 100 and the storage system 200 cooperate to execute control in such a way that the same data is not present in the server cache 130 and the storage cache 220. This can improve the cache using efficiency. In addition, it is possible to secure a storage area available to the server cache 130 and the storage cache 220.

Second Embodiment

According to the first embodiment, every data to be read is stored in the server cache 130. According to a second embodiment of this invention, it is determined whether or not to store data to be read in the server cache 130 based on policy information. The following describes mainly the differences from the first embodiment.

Figure 4:
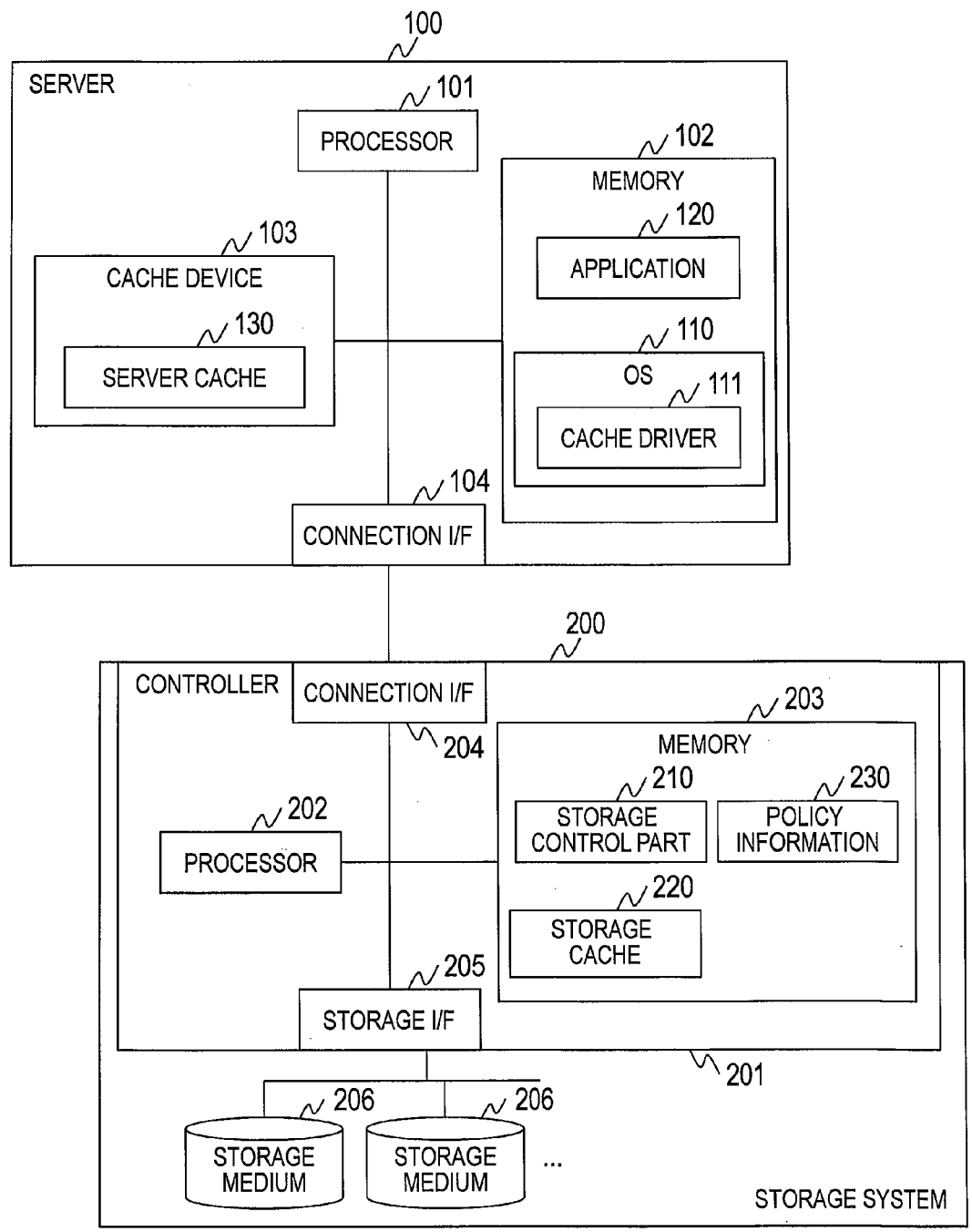
FIG. 4 is a block diagram illustrating an example of the configuration of a computer system according to the second embodiment of this invention.

FIG. 4 is a block diagram illustrating an example of the configuration of a computer system according to the second embodiment of this invention.

The configuration of the computer system according to the second embodiment is the same as that of the first embodiment. Further, the hardware configuration and software configuration of the server 100 according to the second embodiment are the same as those of the first embodiment.

The storage system 200 according to the second embodiment is identical to the first embodiment in the hardware configuration, but is different in the software configuration. Specifically, policy information 230 is newly included in the memory 203.

The policy information 230 stores information for determining whether or not to store data in the server cache 130. The details of the policy information 230 are given later referring to FIG. 5.

FIG. 5 is an explanatory diagram illustrating an example of the policy information 230 in the second embodiment of this invention.

The policy information 230 includes an LUN 301 and an access size threshold 302. The LUN 301 is the identification number of an LU allocated to the server 100 where the application 120 runs. The access size threshold 302 is the threshold of the size of data to be accessed by the application 120.

According to this embodiment, in a case where a read request for data whose size is larger than the access size threshold 302 is detected, the storage control part 210 determines the server cache 130 as the storage destination for the data.

This is to speed up the process of reading the data by storing data with a large size in the server cache 130. The storage capacity of the server cache 130 is limited, and cannot store all pieces of data to be read. Therefore, storing data to be read in the server cache 130 every time a read request is received may result in frequent data replacement. This may disable efficient cache usage.

According to the second embodiment, cache control is therefore carried out in such a way that data, which brings about a great effect on speedup of the reading process, is stored in the server cache 130 by priority based on the policy information 203.

The policy information 230 shown in FIG. 5 is just an example, and this invention is not limited to this example. For example, policy information associating an application with the importance of data or policy information associating an LUN with the threshold of the free space of the storage cache may be used. The policy information 230 need not be set in advance, and may be input by a system administrator or a user.

Figure 6A:
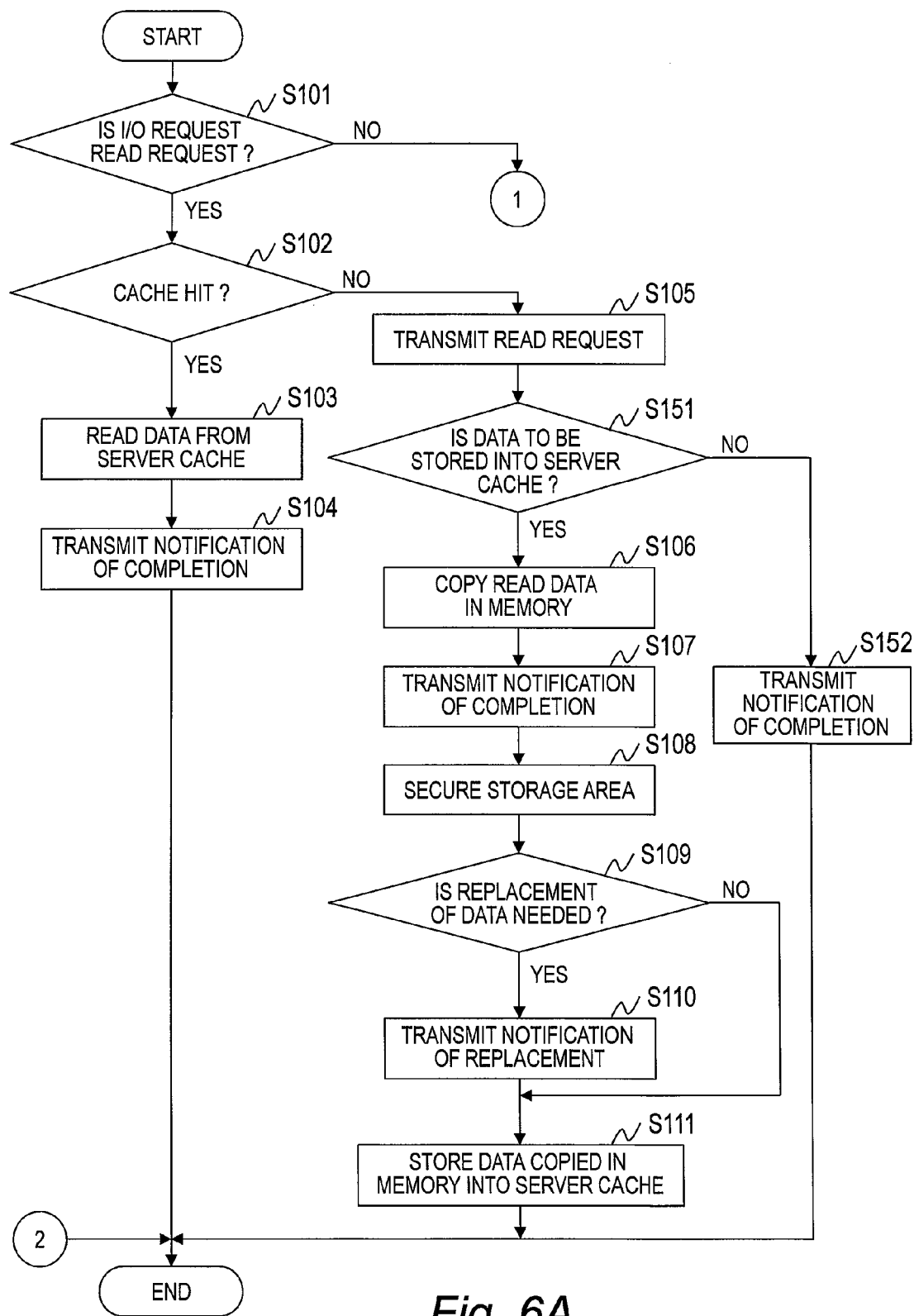
FIGS. 6A and 6B are flowcharts illustrating an example of I/O processing that is performed by the server according to the second embodiment of this invention.
Figure 6B:
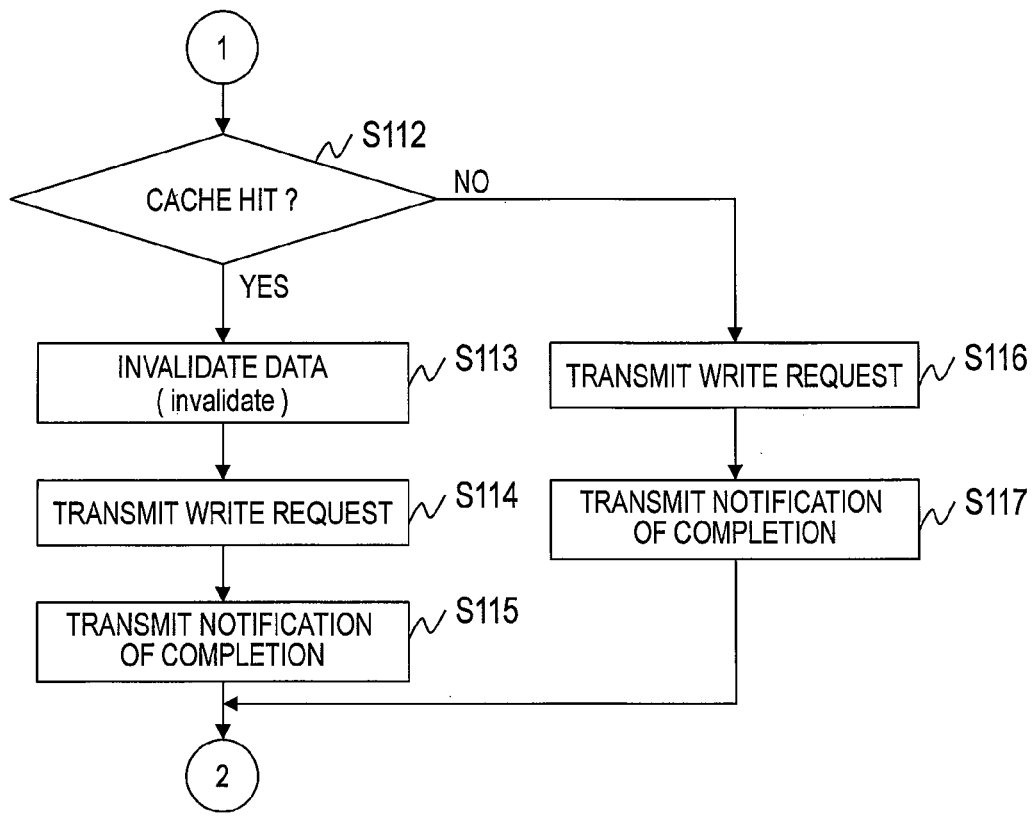

FIGS. 6A and 6B are flowcharts illustrating an example of I/O processing that is performed by the server 100 according to the second embodiment of this invention. The following describes mainly the differences from the first embodiment.

The OS 110 transmits a read request to the storage system 200 (Step S105), and then determines whether or not to store data read from the storage system 200 into the server cache 130 (Step S151). Specifically, the following process is performed.

In a case of receiving a notification of completion from the device driver, the cache driver 111 refers to a determination result included in the notification of completion to determine based on the determination result whether or not to store the data read from the storage system 200 into the server cache 130. The determination result corresponds to the result of the determination process that is executed by the storage system 200 to be described later.

The determination result includes any one of information instructing storage of data to be read into the server cache 130 and information inhibiting storage of data to be read into the server cache 130.

The above is the description of the process of Step S151.

In a case where it is determined that the data read from the storage system 200 is to be stored in the server cache 130, the OS 110 proceeds to Step S106. The processes of Steps S106 to S111 are the same as those of the first embodiment.

In a case where it is determined that the data read from the storage system 200 is not to be stored in the server cache 130, the OS 110 transmits a notification of completion to the application 120 (Step S152), and then terminates the processing. At this time, the cache driver 111 executes control in such a way that the data to be read is not stored in the server cache 130.

Because the other processes are identical to those of the first embodiment, their descriptions are omitted.

Figure 7A:
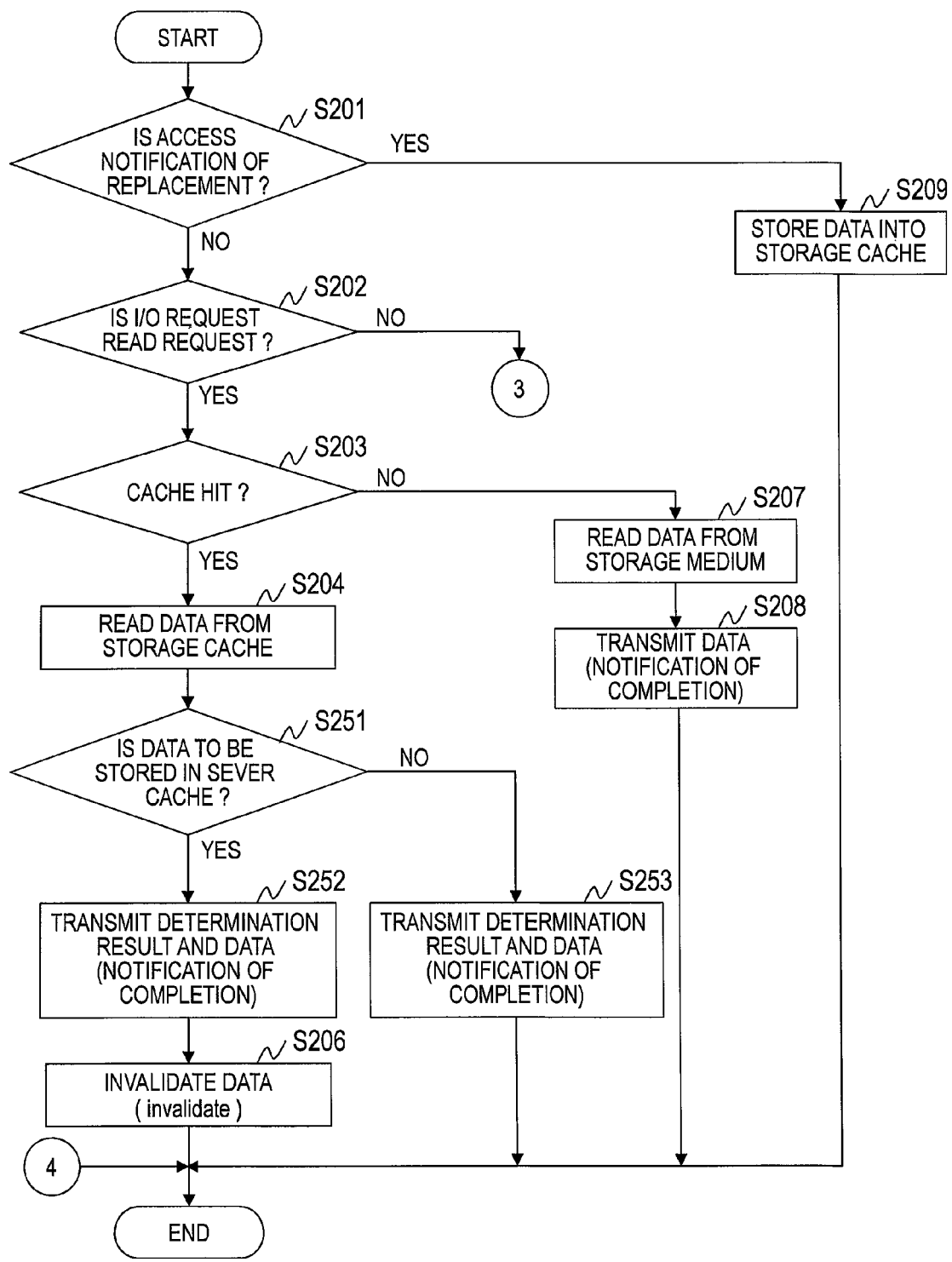
FIGS. 7A and 7B are flowcharts illustrating an example of I/O processing that is performed by the storage system according to the second embodiment of this invention.
Figure 7B:
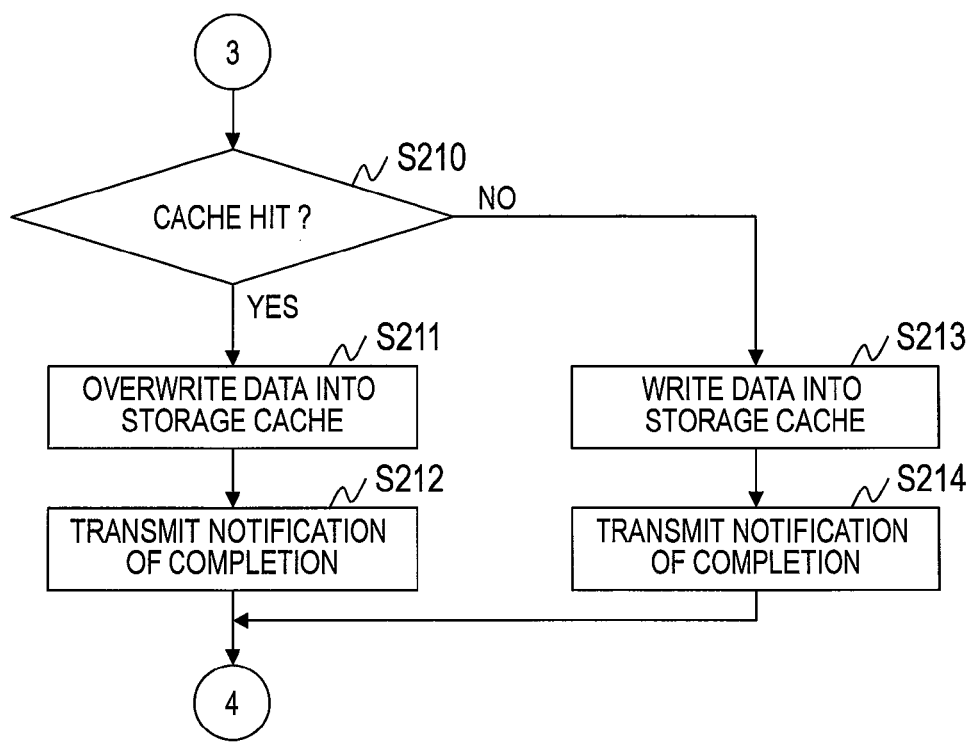

FIGS. 7A and 7B are flowcharts illustrating an example of I/O processing that is performed by the storage system 200 according to the second embodiment of this invention. The following describes mainly the differences from the first embodiment.

The storage control part 210 reads data to be read from the storage cache 220 (Step S204), and then determines based on the policy information 230 whether or not to store the data into the server cache 130 (Step S251). Specifically, the following process is performed.

The storage control part 210 refers to the LUN 301 in the policy information 230 based on the LU identifying information included in the read request to retrieve an entry corresponding to the LU where the data to be read is stored.

The storage control part 210 refers to the access size threshold 302 of the retrieved entry to determine whether or not the size of the data to be read is larger than the value of the access size threshold 302.

The size of the data to be read can be calculated by, for example, multiplying the size of the logical block by the quantity of the block data to be read in a case of reading data logical block by logical block. In a case of reading data file by file, the size of the file may be used.

In a case where the size of the data to be read is larger than the value of the access size threshold 302, the storage control part 210 determines that the data to be read is to be stored in the server cache 130.

The above is the description of the process of Step S251.

In a case where it is determined that the data to be read is to be stored in the server cache 130, the storage control part 210 transmits a determination result including information instructing storage of data to be read into the server cache 130, and the data to be read to the server 100 (Step S252). Then, the storage control part 210 invalidates the data read from the storage cache 220 (Step S207), and terminates the processing.

In a case where it is determined that the data to be read is not to be stored in the server cache 130, the storage control part 210 transmits a determination result including information inhibiting storage of data to be read into the server cache 130, and the data to be read to the server 100 (Step S253), and terminates the processing. Transmission of the read data corresponds to transmission of a notification of completion.

A flag indicating storage of data into the server cache 130 may be used as information included in the determination result. For example, in a case where it is determined that the data to be read is to be stored in the server cache 130, a determination result including a flag is transmitted.

In this case, the cache driver 111 determines whether or not the flag is included in the determination result. In a case where the flag is included in the determination result, the cache driver 111 determines that the data to be read is to be stored in the server cache 130.

According to the second embodiment, data, which brings about a greater effect on the speedup of the reading process among data to be read, is stored in the server cache 130 by priority. This ensures efficient use of the storage area of the cache, and an improvement on the cache using efficiency.

Modification

According to the second embodiment, the storage system 200 performs the process of determining cache control. A modification of this invention differs from the first embodiment in that the server 100 performs the process of determining cache control. The following describes mainly the differences from the first embodiment.

The modification differs from the first embodiment in that policy information is stored in the memory 102 of the server 100. According to the modification, the policy information 230 is not stored in the memory 203 of the storage system 200. The policy information is the same as the policy information 230 in the first embodiment.

The difference in the I/O processing is described below.

The I/O processing of the server 100 differs from that of the first embodiment.

In a case where a cache mishit occurs in Step S102, the OS 110 determines based on the policy information whether or not to store data to be read into the server cache 130.

In a case where it is determined that the data to be read is to be stored in the server cache 130, the OS 110 transmits a determination result indicating storage of the data to be read into the server cache 130, and the read request to the storage system 200. Then, the OS 110 performs the processes of Step S107 and subsequent steps.

In a case where it is determined that the data to be read is not to be stored in the server cache 130, the OS 110 transmits a determination result indicating that the data to be read is not to be stored into the server cache 130, and the read request to the storage system 200. Then, the OS 110 performs the processes of Step S113 and subsequent steps.

The I/O processing of the storage system 200 differs from that of the first embodiment.

In Step S251, the storage control part 210 determines whether or not to store the data to be read in the storage cache 220, based on the determination result received along with the read request.

In Step S252 and Step S253, only data is transmitted. This is because it is unnecessary to transmit the determination result to the server 100.

Third Embodiment

A third embodiment of this invention differs from the first embodiment in the configuration of the computer system. Specifically, a plurality of servers 100 are coupled to the same storage system 200. The following describes mainly the differences of the third embodiment from the first embodiment.

Figure 8:
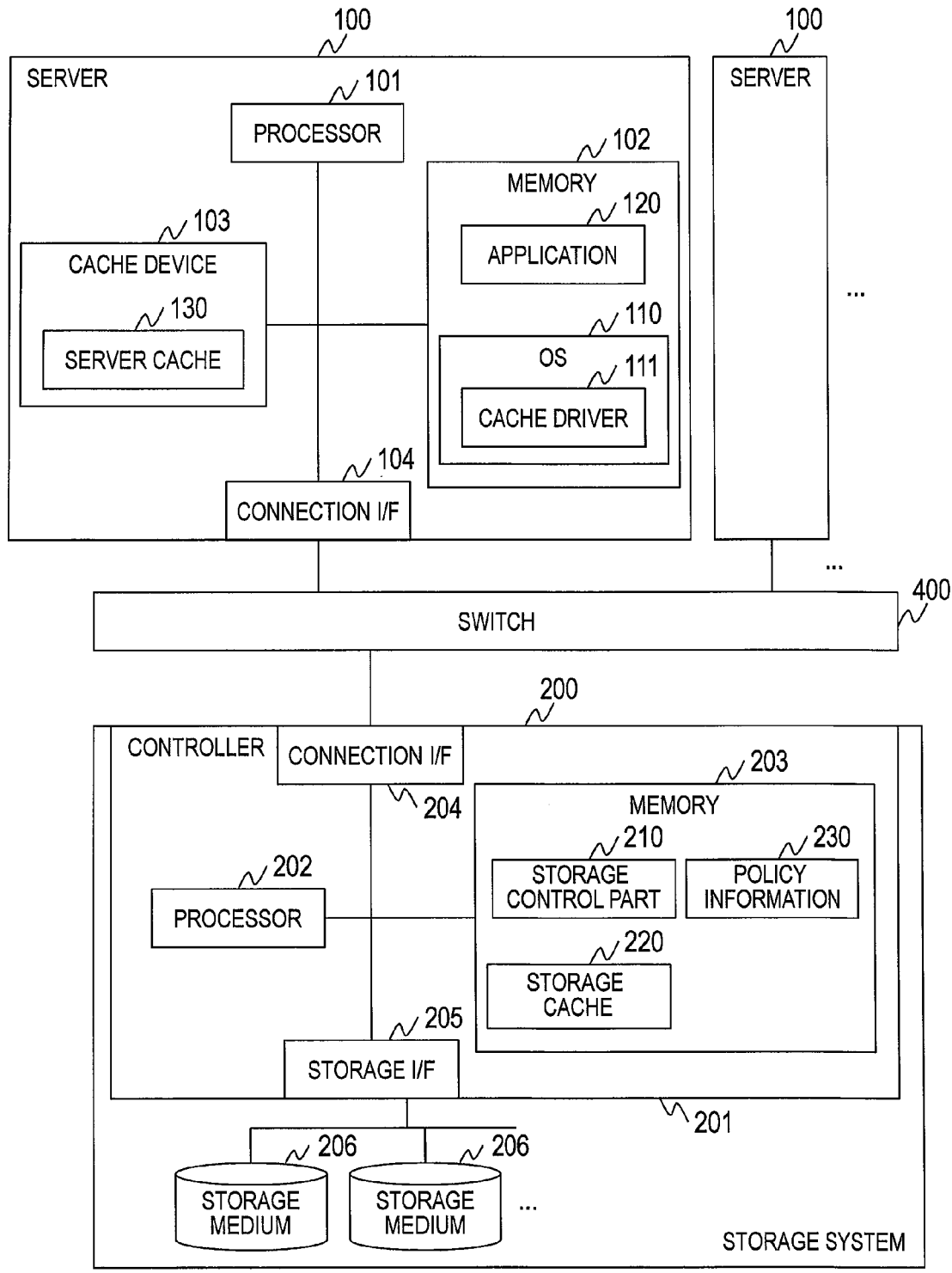
FIG. 8 is a block diagram illustrating an example of the configuration of a computer system according to the third embodiment of this invention.

FIG. 8 is a block diagram illustrating an example of the configuration of a computer system according to the third embodiment of this invention.

A plurality of servers 100 are coupled to the same storage system 200 via a switch 400. The switch 400 may be, for example, an FC switch or the like. According to the third embodiment, the plurality of servers 100 share data to be stored in the storage system 200.

Because the hardware configurations and software configurations of the server 100 and the storage system 200 are the same as those of the first embodiment, their descriptions are omitted.

In a system where a plurality of servers 100 share data, the same data may be stored in the server caches 130 of at least two servers 100. In this case, when a write request is made in one server 100, it is necessary to secure data consistency among the servers holding the same data.

One way to achieve the data consistency is that the storage control part 210 transmits an instruction to invalidate updated data.

Specifically, after performing the process of Step S214, the storage control part 210 transmits an instruction to invalidate data to all the servers 100 coupled to the storage system 200. It should be noted that the instruction includes information identifying written data.

In a case of receiving the instruction, the cache driver 111 of each server 100 determines whether or not target data is stored in the server cache 130 based on the data identifying information. In a case where it is determined that the target data is stored in the server cache 130, the cache driver 111 invalidates this data.

According to the third embodiment, inconsistency of data stored in the caches can be avoided while improving the cache using efficiency.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system, comprising:
a server, on which an application runs; and
a storage system for storing data to be used by the application,
the server including a first processor, a first memory, a cache device, in which a server cache for temporarily storing data is set up, and a first interface for coupling to another apparatus,
the storage system including a controller and a plurality of storage devices,
the controller including a second processor, a second memory, and a second interface for coupling to another device,
the server including an operating system for controlling the server,
the storage system including a storage cache for temporarily storing data and a storage control part for controlling the storage system,
the operating system including a cache driver for controlling the server cache,
wherein the operating system is configured to:
transmit a read request for first data not stored in the server cache to the storage system in a case of receiving the read request for the first data from the application;
transmit the first data received from the storage system to the application; and
store the first data received from the storage system into the server cache, and
wherein the storage control part is configured to:
determine whether the first data is stored in the storage cache in a case of receiving the read request for the first data from the server;
read the first data from the storage cache in a case where it is determined that the first data is stored in the storage cache, transmit the read first data to the server, and invalidate the first data stored in the storage cache; and
read the first data from the plurality of storage devices in a case where it is determined that the first data is not stored in the storage cache, and transmit the read first data to the server.

2. The computer system according to claim 1,
wherein the operating system is further configured to:
determine whether a storage area for storing the first data is secured in the server cache in a case where the first data received from the storage system is to be stored in the server cache;
select predetermined data from among data stored in the server cache in a case where it is determined that the storage area for storing the first data is not secured in the server cache;
transmit a notification of replacement for notifying the storage system of replacement of the predetermined data to; and
store the first data received from the storage system into a storage area where the predetermined data is stored, and
wherein the storage control part is further configured to read the predetermined data from the plurality of storage devices in a case of receiving the notification of replacement, and store the read predetermined data into the storage cache.

3. The computer system according to claim 2,
wherein the storage control part is further configured to:
hold policy information including identification information of a storage area where data is stored, and a threshold of a data size;
read the first data from the storage cache in a case where it is determined that the first data is stored in the storage cache;
refer to the policy information based on the identification information of a first storage area where the first data is stored;
determine whether the data size of the first data is larger than a threshold of a data size corresponding to the first storage area;
transmit the first data and a determination result instructing storage of the first data into the server cache to the server in a case where it is determined that the data size of the first data is larger than the threshold of the data size corresponding to the first storage area, and invalidate the first data stored in the storage cache; and
transmit the first data and a determination result inhibiting storage of the first data into the server cache to the server in a case where it is determined that the data size of the first data is equal to or less than the threshold of the data size corresponding to the first storage area, and
wherein the operating system is further configured to:
determine whether to store the first data received from the storage system into the server cache based on the determination result received together with the first data in a case of receiving the first data from the storage system;
transmit the first data to the application in a case where it is determined that the first data received from the storage system is to be stored into the server cache, and store the first data received from the storage system into the server cache; and
transmit the first data to the application in a case where it is determined that the first data received from the storage system is not to be stored into the server cache.

4. The computer system according to claim 2,
wherein the operating system is further configured to:
hold policy information including identification information of a storage area where data is stored, and a threshold of a data size;
refer to the policy information based on the identification information of a first storage area where the first data is stored in a case of receiving the read request for the first data from the application;
determine whether the data size of the first data is larger than a threshold of a data size corresponding to the first storage area;
transmit a determination result indicating storage of the first data into the server cache and the read request for the first data to the storage system in a case where it is determined that the data size of the first data is larger than the threshold of the data size corresponding to the first storage area, transmit the first data received from the storage system to the application, and store the first data received from the storage system into the server cache; and
transmit a determination result indicating that the first data is not to be stored into the server cache and the read request for the first data to the storage system in a case where it is determined that the data size of the first data is equal to or less than the threshold of the data size corresponding to the first storage area, and transmit the first data received from the storage system to the application, and wherein the storage control part is further configured to:

read the first data from the storage cache in a case where it is determined that the first data is stored in the storage cache;

determine whether to store the first data into the server cache based on the determination result received together with the read request for the first data;

transmit the read first data to the server in a case where it is determined that the first data is not to be stored into the server cache; and transmit the read first data to the server and invalidate the first data stored in the storage cache in a case where it is determined that the first data is to be stored into the server cache.

5. The computer system according to claim 2, wherein a plurality of the servers are coupled to the storage system, wherein the same second data is stored in the server caches of at least two of the plurality of the servers, and wherein the storage control part is further configured to:

update the second data stored in the storage cache in a case of receiving a write request for the second data from one of the at least two servers; and transmit an instruction to invalidate the second data to the at least two servers.

6. The computer system according to claim 1, wherein the operating system is further configured to:

determine whether a storage area for storing the first data is secured in the server cache in a case where the first data received from the storage system is to be stored in the server cache;

select predetermined data from among data stored in the server cache in a case where it is determined that the storage area for storing the first data is not secured in the server cache;

transmit a notification of replacement including the predetermined data to the storage system; and store the first data received from the storage system into a storage area where the predetermined data is stored, and wherein the storage controller is further configured to store the predetermined data included in the notification of replacement into the storage cache in a case of receiving the notification of replacement.

7. A cache control method for a computer system, the computer system including a server, on which an application runs, and a storage system for storing data to be used by the application, the server including a first processor, a first memory, a cache device, in which a server cache for temporarily storing data is set up, and a first interface for coupling to another apparatus, the storage system including a controller and a plurality of storage devices, the controller including a second processor, a second memory, and a second interface for coupling to another device, the server including an operating system for controlling the server, the storage system including a storage cache for temporarily storing data and a storage control part for controlling the storage system, the operating system including a cache driver for controlling the server cache, the cache control method including:

a first step of transmitting, by the operating system, a read request for first data not stored in the server cache to the storage system in a case of receiving the read request for the first data from the application;

a second step of transmitting, by the operating system, the first data received from the storage system to the application;

a third step of storing, by the operating system, the first data received from the storage system into the server cache;

a fourth step of determining, by the storage control part, whether the first data is stored in the storage cache in a case of receiving the read request for the first data from the server;

a fifth step of reading, by the storage control part, the first data from the storage cache in a case where it is determined that the first data is stored in the storage cache, transmitting the read first data to the server, and invalidating the first data stored in the storage cache; and a sixth step of reading, by the storage control part, the first data from the plurality of storage devices in a case where it is determined that the first data is not stored in the storage cache, and transmitting the read first data to the server.

8. The cache control method according to claim 7, wherein the third step further includes:

determining whether a storage area for storing the first data is secured in the server cache;

selecting predetermined data from among data stored in the server cache in a case where it is determined that the storage area for storing the first data is not secured in the server cache;

transmitting a notification of replacement for notifying the storage system of replacement of the predetermined data to the storage system; and storing the first data received from the storage system into a storage area where the predetermined data is stored, and wherein the cache control method further includes:

reading, by the storage control part, the predetermined data from the plurality of storage devices in a case of receiving the notification of replacement; and storing, by the storage control part, the read predetermined data into the storage cache.

9. The cache control method according to claim 8, wherein the storage control part is further configured to hold policy information including identification information of a storage area where data is stored, and a threshold of a data size, wherein the fifth step further includes:

reading the first data from the storage cache;

referring to the policy information based on the identification information of a first storage area where the first data is stored to determine whether the data size of the first data is larger than a threshold of a data size corresponding to the first storage area;

transmitting the first data and a determination result instructing storage of the first data into the server cache to the server in a case where it is determined that the data size of the first data is larger than the threshold of the data size corresponding to the first storage area, and invalidating the first data stored in the storage cache; and transmitting the first data and a determination result inhibiting storage of the first data into the server cache to the server in a case where it is determined that the data size of the first data is equal to or less than the threshold of the data size corresponding to the first storage area, and wherein the second step further includes:

determining whether to store the first data received from the storage system into the server cache based on the determination result received together with the first data;

transmitting the first data received from the storage system to the application in a case where it is determined that the first data is to be stored into the server cache, and storing the first data received from the storage system into the server cache; and transmitting the first data received from the storage system to the application in a case where it is determined that the first data is not to be stored into the server cache.

10. The cache control method according to claim 8, wherein the operating system is further configured to hold policy information including identification information of a storage area where data is stored, and a threshold of a data size, wherein the first step further includes:

referring to the policy information based on the identification information of a first storage area where the first data is stored to determine whether the data size of the first data is larger than a threshold of a data size corresponding to the first storage area;

transmitting a determination result indicating storage of the first data into the server cache and the read request for the first data to the storage system in a case where it is determined that the data size of the first data is larger than the threshold of the data size corresponding to the first storage area; and transmitting a determination result indicating that the first data is not to be stored into the server cache and the read request for the first data to the storage system in a case where it is determined that the data size of the first data is equal to or less than the threshold of the data size corresponding to the first storage area, wherein the third step further includes storing the first data received from the storage system into the server cache in a case where it is determined that the data size of the first data is larger than the threshold of the data size corresponding to the first storage area, and wherein the fifth step further includes:

reading the first data from the storage cache;

determining whether to store the first data into the server cache based on the determination result received together with the read request for the first data;

transmitting the read first data to the server in a case where it is determined that the first data is not to be stored into the server cache; and transmitting the read first data to the server and invalidating the first data stored in the storage cache in a case where it is determined that the first data is to be stored into the server cache.

11. The cache control method according to claim 8, wherein a plurality of the servers are coupled to the storage system, wherein the same second data is stored in the server caches of at least two of the plurality of the servers, and wherein the cache control method further includes:

updating, by the storage control part the second data stored in the storage caches in a case of receiving a write request for the second data from one of the at least two servers; and transmitting, by the storage control part, an instruction to invalidate the second data to the at least two servers.

12. The cache control method according to claim 7, wherein the third step further includes:

determining whether a storage area for storing the first data is secured in the server cache;

selecting predetermined data from among data stored in the server cache in a case where it is determined that the storage area for storing the first data is not secured in the server cache;

transmitting a notification of replacement including the predetermined data to the storage system; and storing the first data received from the storage system into a storage area where the predetermined data is stored, and wherein the cache control method further includes storing, by the storage control part, the predetermined data included in the notification of replacement into the storage cache in a case of receiving the notification of replacement.

* * * * *